United States Patent
Shimizu (10) Patent No.: US 12,419,290 B2
(45) Date of Patent: Sep. 23, 2025

(54) FISHING SPINNING REEL

(71) Applicant: GLOBERIDE, Inc., Tokyo (JP)

(72) Inventor: Yoshihito Shimizu, Tokyo (JP)

(73) Assignee: GLOBERIDE, INC, Tokyo (JP)

( * ) Notice: Subject to any disclaimer, the term of this patent is extended or adjusted under 35 U.S.C. 154(b) by 376 days.

(21) Appl. No.: 18/072,419

(22) Filed: Nov. 30, 2022

(65) Prior Publication Data

US 2023/0165232 A1   Jun. 1, 2023

(30) Foreign Application Priority Data

Nov. 30, 2021   (JP) .................................. 2021-193991

(51) Int. Cl.
*A01K 89/01*   (2006.01)

(52) U.S. Cl.
CPC .............................. *A01K 89/01084* (2015.05)

(58) Field of Classification Search
CPC .. A01K 89/00; A01K 89/006; A01K 89/0108; A01K 89/027; A01K 89/011223; A01K 89/06; A01K 89/0117–0118; A01K 89/01081–01087
See application file for complete search history.

(56) References Cited

U.S. PATENT DOCUMENTS

| | | | | |
|---|---|---|---|---|
| 5,350,132 A | * | 9/1994 | Hitomi | A01K 89/0117 242/232 |
| 5,524,832 A | * | 6/1996 | Sakaguchi | A01K 89/01084 242/248 |
| 9,706,761 B1 | * | 7/2017 | Ochiai | A01K 89/01083 |
| 10,575,507 B2 | * | 3/2020 | Takamatsu | A01K 89/0114 |
| 2005/0189446 A1 | * | 9/2005 | Myojo | A01K 89/01083 242/231 |

FOREIGN PATENT DOCUMENTS

| | | | |
|---|---|---|---|
| JP | 2011244752 A | * | 12/2011 |
| JP | 2016202133 A | | 12/2016 |

OTHER PUBLICATIONS

Nov. 21, 2023 Office Action issued in Australian Patent Application No. 2022279446.
Jun. 27, 2024 Office Action issued in Chinese Patent Application No. 202211471653.9.
Extended European Search Report for related European Application; 22209863.4; report dated Apr. 10, 2023; (9 pages).
Extended European Search Report for related European Application; 22209863.4; report dated May 10, 2023; (9 pages).

* cited by examiner

*Primary Examiner* — Anna M Momper
(74) *Attorney, Agent, or Firm* — Oliff PLC (57) ABSTRACT

In a reversing mechanism for a bail in a fishing spinning reel, an abutting member for returning includes a bearing that a rotational movement shaft is inserted into, a projection portion that projects from the bearing in a radially outward direction, and a protrusion portion that protrudes from the projection portion in an axial direction of the rotational movement shaft. The projection portion includes a first abutting portion that abuts a guide in the first half of a rotational movement of the abutting member for returning. The protrusion portion includes a second abutting portion that abuts the guide in the latter half of a rotational movement of the abutting member for returning. The guide comprises a first flat guide face that on which the first abutting portion abuts and a second flat guide face on which the second abutting portion abuts.

5 Claims, 12 Drawing Sheets

FISHING SPINNING REEL

CROSS-REFERENCE TO RELATED APPLICATION

This application claims priority under 35 U.S.C. § 119 to Japanese Patent Application No. 2021-193991 filed on Nov. 30, 2021 in the Japanese Patent Office, the entire contents of each hereby incorporated by reference.

FIELD

The present disclosure relates to a fishing spinning reel.

BACKGROUND

In general, a fishing spinning reel includes a rotor that rotates in conjunction with a winding-up operation performed on a handle, and a spool that moves forward or backward in accordance with the winding-up operation performed on the handle. The rotor includes a bail support member that is supported by a pair of support arms in a rotationally movable manner. A bail that is used to pick up a fishing line is installed on the bail support member.

Conventionally, the fishing spinning reel includes a reversing mechanism that causes the bail support member (the bail) to return from a fishing line releasing position to a fishing line winding-up position (see, for example, JP 2016-202133 A). The reversing mechanism includes a guide for which an end is coupled to the bail support member, and an abutting member for returning that abuts onto the guide in accordance with rotation in a fishing line winding-up direction of the rotor, and causes the bail support member that is located in the fishing line releasing position to return to the fishing line winding-up position. In the fishing spinning reel including the reversing mechanism, as described above, if an operation is performed to rotate the handle in a state where the bail support member (the bail) is located in the fishing line releasing position, the abutting member for returning abuts onto the guide in conjunction with rotation of the rotor, and abutting force causes the bail support member to return from the fishing line releasing position to the fishing line winding-up position.

SUMMARY OF THE DISCLOSURE

Meanwhile, in the conventional fishing spinning reel, in order to further improve an operation feeling at the time of returning in an operation to rotate the handle, it has been desired that the abutting force of the abutting member for returning due to rotational movement be efficiently transmitted to the guide.

The present disclosure has been made in order to solve such a problem, and it is an object of the present disclosure to provide a fishing spinning reel that is capable of efficiently transmitting the abutting force of an abutting member for returning to a guide, and is capable of improving an operation feeling at the time of returning in an operation to rotate a handle.

In order to solve the problem described above, a fishing spinning reel according to the present disclosure comprises: an arm that is provided in a rotor included in a reel body; a bail support member that is installed on the arm, and is rotationally movable between a fishing line winding-up position and a fishing line releasing position; and a reversing mechanism that causes the bail support member to return from the fishing line releasing position to the fishing line winding-up position. The reversing mechanism comprises: a guide that comprises an end coupled to the bail support member, and is swingably installed on the arm; and an abutting member for returning that is provided in the arm in a rotationally movable manner by using a rotational movement shaft, abuts onto the guide in accordance with rotation in a fishing line winding-up direction of the rotor, and causes the bail support member located in the fishing line releasing position to return to the fishing line winding-up position. The abutting member for returning comprises a bearing that the rotational movement shaft is inserted into, a projection portion that projects from the bearing to an outside in a radial direction with the rotational movement shaft as a center, and a protrusion portion that protrudes from the projection portion toward a side of the guide in an axial direction of the rotational movement shaft. The projection portion comprises a first abutting portion that abuts onto the guide in the first half of a rotational movement of the abutting member for returning, and the protrusion portion comprises a second abutting portion that abuts onto the guide in the latter half of the rotational movement of the abutting member for returning. The guide comprises a first guide face that the first abutting portion abuts onto, and a second guide face that the second abutting portion abuts onto. In a case where a length (distance) from the center of swinging of the guide to the first guide face is L1, and a length (distance) from the center of the swinging of the guide to the second guide face is L2, a relationship of L1>L2 is satisfied.

In this fishing spinning reel, the abutting member for returning comprises two abutting portions, the first abutting portion that abuts onto the guide in the first half of a rotational movement of the abutting member for returning, and the second abutting portion that abuts onto the guide in the latter half of the rotational movement of the abutting member for returning. From among these abutting portions, the first abutting portion is disposed in the projection portion that projects to an outside in the radial direction from the bearing that the rotational movement shaft is inserted into, in the abutting member for returning. Therefore, an abutting force of the abutting member for returning can be transmitted to the first guide face of the guide on an extension in the radial direction of the bearing. Accordingly, in the abutting of the first abutting portion and the first guide face, the bearing is not inclined relative to the rotational movement shaft, and a smooth rotational movement of the abutting member for returning can be achieved. This enables an abutting force of the abutting member for returning to be efficiently transmitted to the guide, and an operation feeling at the time of returning in an operation to rotate a handle can be improved.

Furthermore, a relationship between the length L1 from the center of swinging of the guide to the first guide face and the length L2 from the center of swinging of the guide to the second guide face satisfies L1>L2. Therefore, in the first half of a rotational movement of the abutting member for returning that uses an abutting force that is greater than an abutting force of the latter half of the rotational movement, an abutting force of the abutting member for returning can be efficiently transmitted to the guide. Accordingly, an operation feeling at the time of returning in an operation to rotate the handle can be improved. Furthermore, in the latter half of the rotational movement of the abutting member for returning, the second abutting portion abuts onto the second guide face. Therefore, the guide does not need to be formed to be longer than necessary, and a reduction in size of a structure can be achieved. Note that the latter half of the rotational movement of the abutting member for returning does not use an abutting force that is greater than an abutting force of the first half of the rotational movement. Therefore, even in a configuration in which the second abutting portion abuts onto the second guide face, the bearing is not inclined relative to the rotational movement shaft, and an abutting force of the abutting member for returning can be efficiently transmitted to the guide.

Moreover, it is preferable that an abutting face of the first abutting portion and the first guide face abut onto each other to be roughly parallel to each other, when viewed from the radial direction of the rotational movement shaft.

By employing this configuration, an abutting force can be efficiently transmitted from the first abutting portion to the first guide face. Accordingly, an operation feeling at the time of returning in an operation to rotate the handle can be further improved.

By employing a fishing spinning reel according to the present disclosure, the abutting force of an abutting member for returning can be efficiently transmitted to a guide, and an operation feeling at the time of returning in an operation to rotate a handle can be improved.

BRIEF DESCRIPTION OF THE DRAWINGS

FIGS. 2A and 2B are diagrams illustrating an arm and a bail support portion in a fishing line winding-up position of the fishing spinning reel according to the embodiment of the present disclosure.

FIGS. 3A and 3B are diagrams illustrating the arm and the bail support portion in a fishing line releasing position of the fishing spinning reel according to the embodiment of the present disclosure.

FIGS. 4A and 4B are diagrams illustrating an abutting state of the abutting member for returning and the guide member of the fishing spinning reel according to the embodiment of the present disclosure.

FIGS. 6A and 6B are diagrams illustrating the arm and the bail support portion near a dead point, which is an intermediate position between the fishing line releasing position and the fishing line winding-up position, of the fishing spinning reel according to the embodiment of the present disclosure, FIGS. 7A and 7B are diagrams illustrating the arm and the bail support portion in the latter half of a rotational movement of the abutting member for returning of the fishing spinning reel according to the embodiment of the present disclosure.

DETAILED DESCRIPTION

Figure 1:
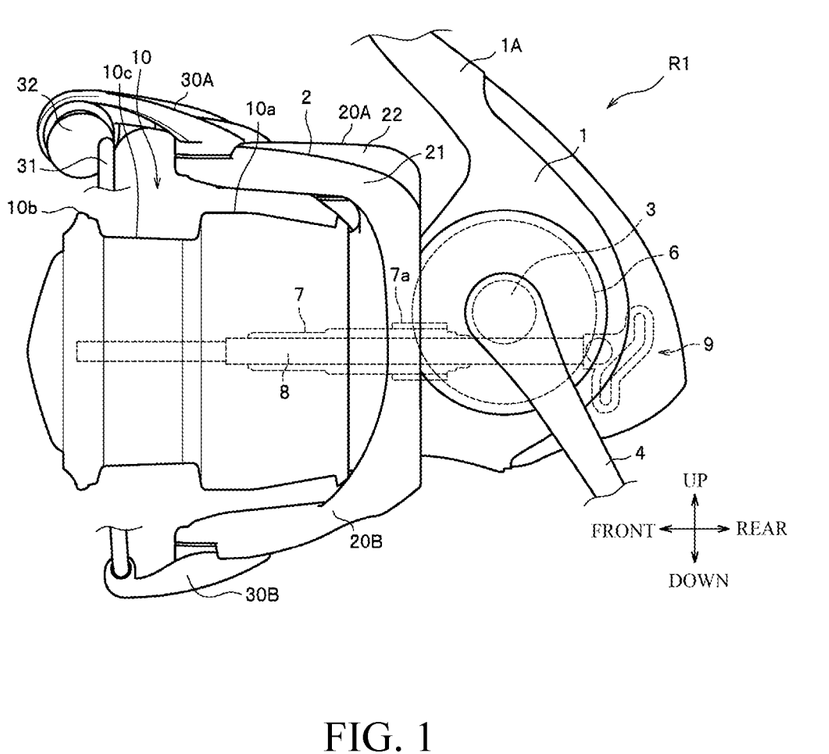
FIG. 1 is a schematic side view illustrating a fishing spinning reel according to an embodiment of the present disclosure.
Figure 2A:
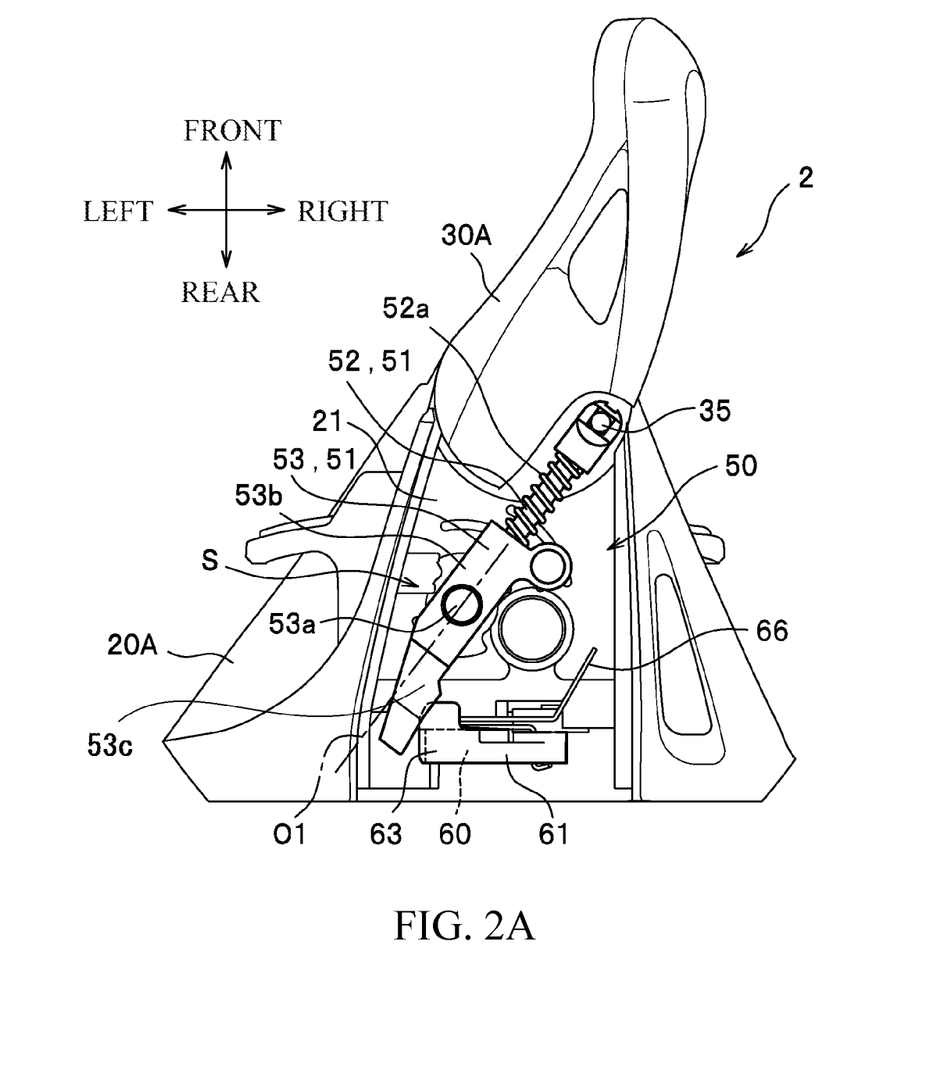
FIG. 2A is a side view illustrating an internal structure of the arm.
Figure 2B:
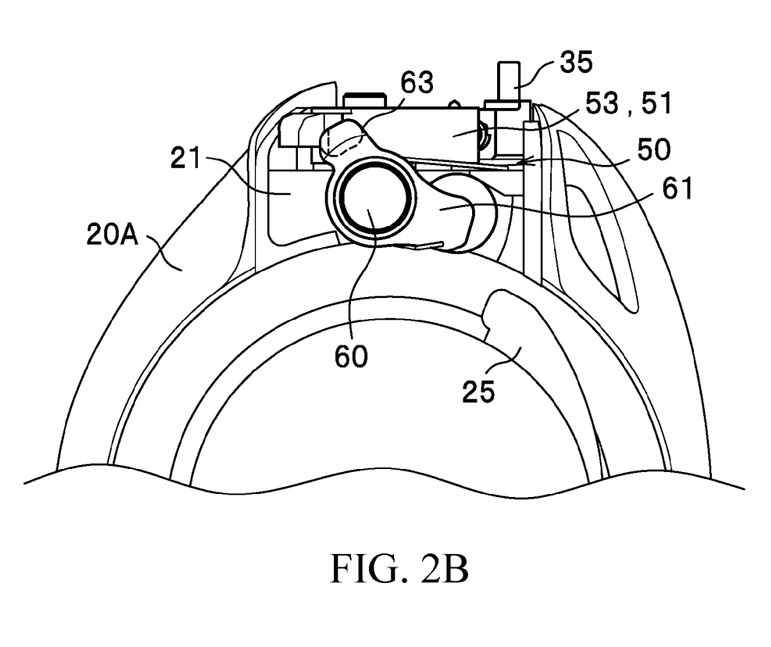
FIG. 2B is an explanatory diagram illustrating an abutting state of an abutting member for returning and a guide member.

A spool of a fishing spinning reel according to an embodiment of the present disclosure is described below with reference to the drawing as appropriate. In the description of the embodiment, when "up/down" or "front/rear" is referred to, the direction illustrated in FIG. 1 is used as a reference. When "left/right" is referred to, the direction illustrated in FIG. 2 is used as a reference.

As illustrated in FIG. 1, principally, a fishing spinning reel R1 comprises a reel body 1 that comprises a leg 1A that is used for mounting on a not-illustrated fishing rod, a rotor 2 that is rotatably provided on a front side of the reel body 1, and a spool 10 that is provided to be movable in a front-side/rear-side direction in synchronization with a rotational motion of the rotor 2.

The reel body 1 rotatably supports a handle shaft 3 with a not-illustrated bearing interposed therebetween, and a handle 4 is installed at a protrusion end of the handle shaft 3. A winding-up operation is performed on the handle 4. A shaft tube is whirl-stopped and fixed to the handle shaft 3. A drive gear 6 has been formed integrally with this shaft tube, and the drive gear 6 comprises internal teeth that are used to drive the rotor 2 for winding up. The drive gear 6 meshes with a pinion gear 7a of a driving shaft tube 7, and the driving shaft tube 7 extends in a direction that is orthogonal to the handle shaft 3, and comprises a cavity that extends in an axial direction.

The driving shaft tube 7 is rotatably supported by the reel body 1 with a bearing interposed therebetween, and a spool shaft 8 is inserted into the cavity of the driving shaft tube 7 to be movable in the axial direction. The spool shaft 8 extends in the direction that is orthogonal to the handle shaft 3, and a spool 10 is installed on a distal end side of the spool shaft 8.

At a rear end of the spool shaft 8, a publicly known oscillating mechanism 9 is provided, and the oscillating mechanism 9 is used to move the spool shaft 8 to a front side or a rear side.

The driving shaft tube 7 extends toward a side of the spool 10, and the rotor 2 is installed at a front end of the driving shaft tube 7. Note that in the driving shaft tube 7, rotation in a reverse direction (rotation in the fishing line releasing direction) is regulated by a not-illustrated one-way clutch.

The rotor 2 comprises a cylinder that is located in a skirt 10a of the spool 10, and a pair of arms 20A and 20B. At front ends of the respective arms 20A and 20B, bail support members 30A and 30B are supported to be rotationally movable between the fishing line winding-up position and the fishing line releasing position, and a bail 31 is arranged between these bail support members 30A and 30B. The bail 31 picks up a fishing line in a released state. In the bail 31, one proximal end is installed on a line roller 32 that is provided integrally with the bail support member 30A, and another proximal end is installed on the bail support member 30B. Inside the arm 20A, a reversing mechanism 50 is provided, as illustrated in FIG. 2. Details of the reversing mechanism 50 will be described later.

The spool 10 comprises a fishing line winding drum 10c between the skirt 10a and a front side flange 10b, and has a cylindrical shape, as illustrated in FIG. 1. A not-illustrated fishing line is wound around the fishing line winding drum 10c.

In the fishing spinning reel R1, as described above, if a winding-up operation is performed on the handle 4, the rotor 2 is driven to rotate by using the drive gear 6 and the pinion gear 7a, and the spool 10 is moved to the front side or the rear side by using the pinion gear 7a and the oscillating mechanism 9. As a result of this, the not-illustrated fishing line is evenly wound around the fishing line winding drum 10c of the spool 10 by using a line roller 2g.

Next, details of the arm 20A and the reversing mechanism 50 included in the arm 20A are described. The arm 20A comprises an arm body 21 and a cover member 22 that covers the arm body 21, as illustrated in FIG. 1. The arm body 21 has a roughly L-shape in a side view, and extends forward from a rear end of the rotor 2 along the skirt 10a of the spool 10. Between the arm body 21 and the cover member 22, a housing space S is disposed, and in the housing space S, members that are included in the reversing mechanism 50 are housed.

The reversing mechanism 50 is a mechanism that reverses the bail support member 30A, and causes the bail 31 (see FIG. 1) to return to the fishing line winding-up position, in a case where a winding-up operation has been performed on the handle 4 (see FIG. 1) to rotate the rotor 2 in a state where the bail 31 has been raised to the fishing line releasing position. The reversing mechanism 50 comprises a guide 51, and an abutting member for returning 61. The guide 51 comprises a shaft 52 and a guide member 53.

The shaft 52 is a member that slidably supports the guide member 53, and a front end is coupled to the bail support member 30A with a coupling shaft 35 interposed therebetween. A coil spring 52a is installed between the shaft 52 and the guide member 53 in a state where the coil spring 52a is compressed to have biasing force. The guide member 53 is swingably installed on the arm body 21 by using a shaft portion 53a. The guide member 53 comprises an insertion hole along a longitudinal direction, and the shaft 52 is inserted into the insertion hole.

The shaft 52, the coil spring 52a, and the guide member 53, as described above, can bias the bail 31 (the bail support members 30A and 30B) to the fishing line winding-up position or the fishing line releasing position, and can hold the bail 31 in the fishing line winding-up position or the fishing line releasing position. The guide member 53 of the reversing mechanism 50 and the abutting member for returning 61 are described in detail below.

Figure 4A:
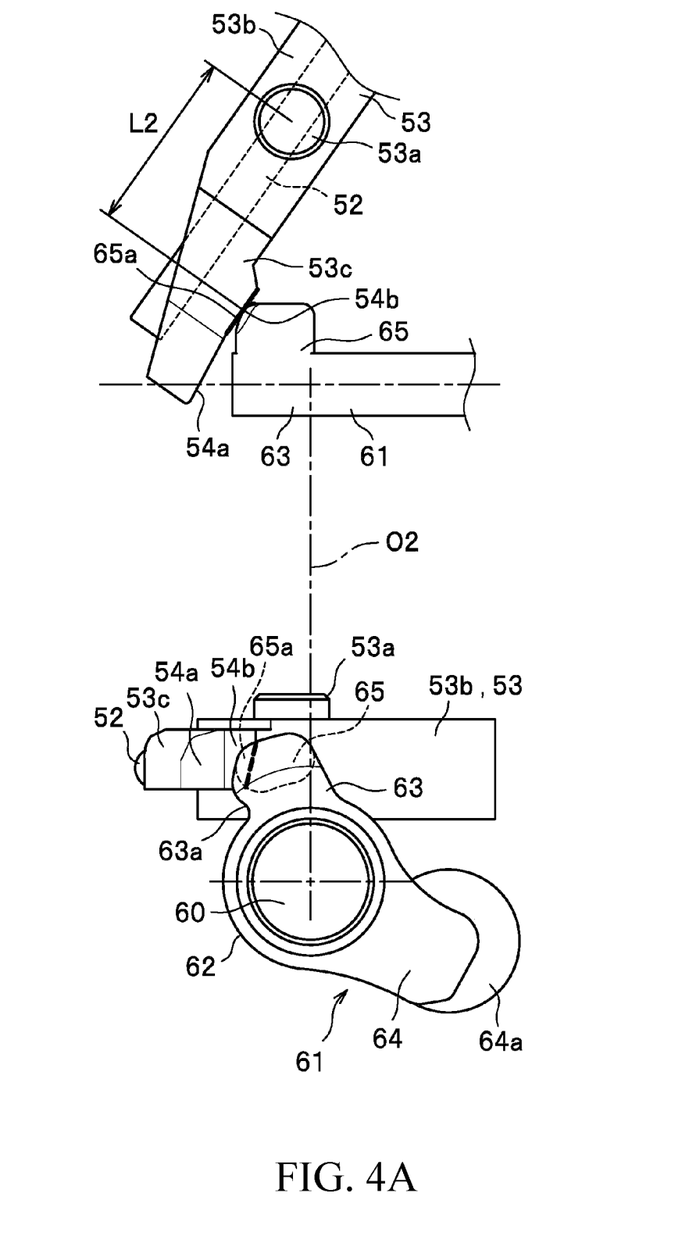
FIG. 4A is an enlarged side view illustrating an abutting state in the fishing line winding-up position.
Figure 4B:
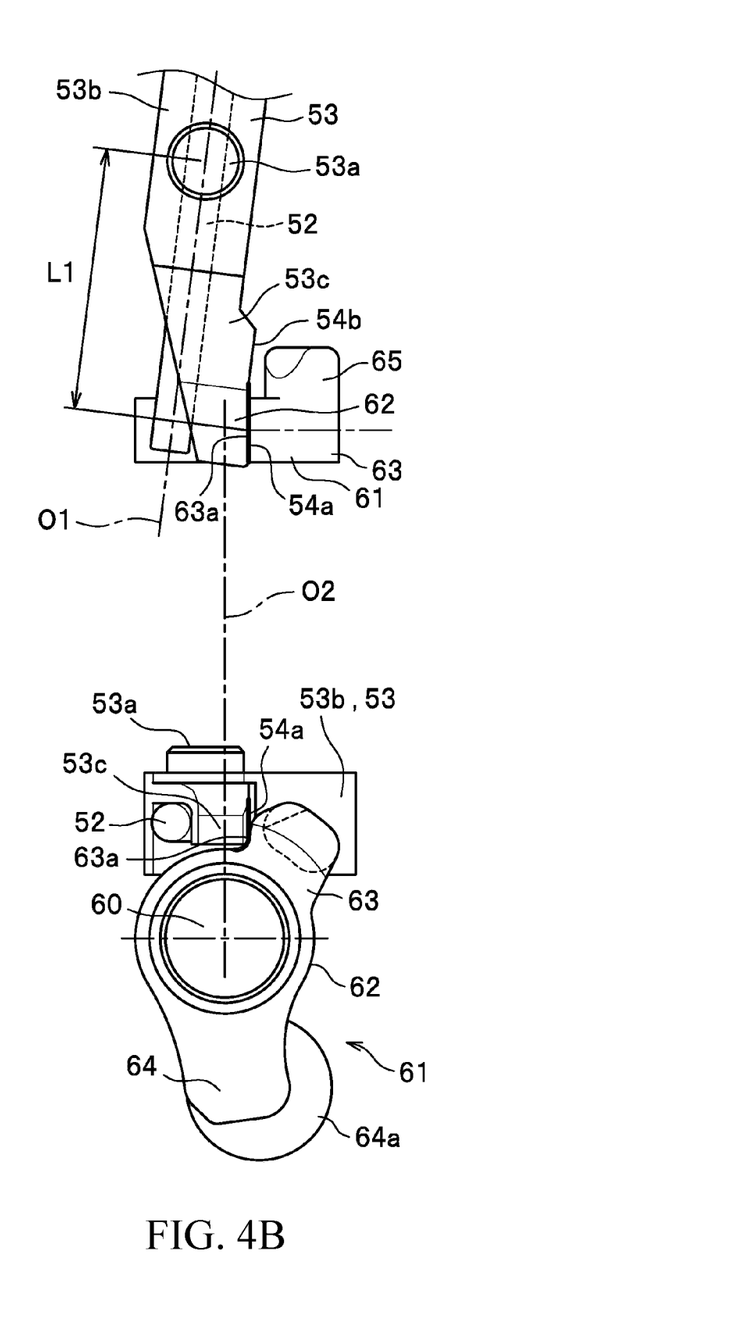
FIG. 4B is an enlarged side view illustrating an abutting state in the fishing line releasing position.

The guide member 53 comprises a base 53b that comprises the shaft portion 53a, and has a roughly rectangular parallelepiped shape, and a guide abutting portion 53c that integrally extends from a distal end of the base 53b to a rear side. The guide abutting portion 53c is a portion that the abutting member for returning 61 abuts onto. The guide abutting portion 53c extends to be inclined to a right-hand side (a side where the abutting member for returning 61 is disposed) relative to center line O1 of the base 53b that passes through a center of the shaft portion 53a, and is disposed closer to the abutting member for returning 61 that is disposed on the right-hand side, as illustrated in FIG. 2A. On a right-hand side face of the guide abutting portion 53c, a first guide face 54a and a second guide face 54b are disposed, as illustrated in FIGS. 4A and 4B, and the first guide face 54a and the second guide face 54b function as an abutting face that the abutting member for returning 61 abuts onto. Stated another way, the guide abutting portion 53c comprises two abutting faces that are located in positions different from each other in the front-side/rear-side direction.

The first guide face 54a is a flat abutting face that is disposed on a side of a distal end of the right-hand side face of the guide abutting portion 53c. The first guide face 54a is disposed to be roughly parallel to center axis O2 of the rotational movement shaft 60 described later of the abutting member for returning 61 in the fishing line releasing position, as illustrated in FIG. 4B. Note that the first guide face 54a is slightly narrowed in a portion closer toward a distal end, and a face width decreases in the portion closer toward the distal end. The first guide face 54a functions as an abutting receiving face relative to the first abutting portion 63a described later of the abutting member for returning 61. The second guide face 54b is a flat abutting face that is continuous to a rear end of the first guide face 54a, and is a face that is roughly parallel to center line O1 of the base 53b. The first guide face 54a is slightly inclined to a right-hand side relative to the second guide face 54b (center line O1), and is disposed further closer toward the abutting member for returning 61 on the right-hand side.

Here, as illustrated in FIGS. 4A and 4B, it is assumed that a length from the center of the shaft portion 53a to a central portion in the front-side/rear-side direction of the first guide face 54a is L1, and a length between the center of the shaft portion 53a to a central portion in the front-side/rear-side direction of the second guide face 54b is L2. In this case, a relationship between the lengths has been set in such a way that L1<L2.

Next, the abutting member for returning 61 is described. The abutting member for returning 61 comprises a shaft that is supported by the rotational movement shaft 60 at the rear end of the arm body 21, and is provided to be rotationally movable in a leftward/rightward direction with the rotational movement shaft 60 as a center, as illustrated in FIG. 2B. The abutting member for returning 61 abuts onto the guide abutting portion 53c of the guide member 53 in accordance with rotation in the fishing line winding-up direction of the rotor 2 due to an operation to rotate the handle 4, and transmits abutting force to the guide member 53. The abutting member for returning 61 comprises a first abutting portion 63a and a second abutting portion 65a that abut onto the guide abutting portion 53c.

The abutting member for returning 61 comprises a bearing 62 that has an annular shape and into which the rotational movement shaft 60 is inserted, a projection portion 63 that projects from the bearing 62 to an outside in a radial direction with the rotational movement shaft 60 as a center, and a protrusion portion 65 that protrudes from the projection portion 63 toward the guide member 53 in an axial direction of the rotational movement shaft 60, as illustrated in FIGS. 4A and 4B and FIGS. 5A and 5B. Furthermore, the abutting member for returning 61 comprises a roller support portion 64 that projects to a roughly opposite side of the projection portion 63. The roller support portion 64 rotatably supports a roller 64a.

Figure 5A:
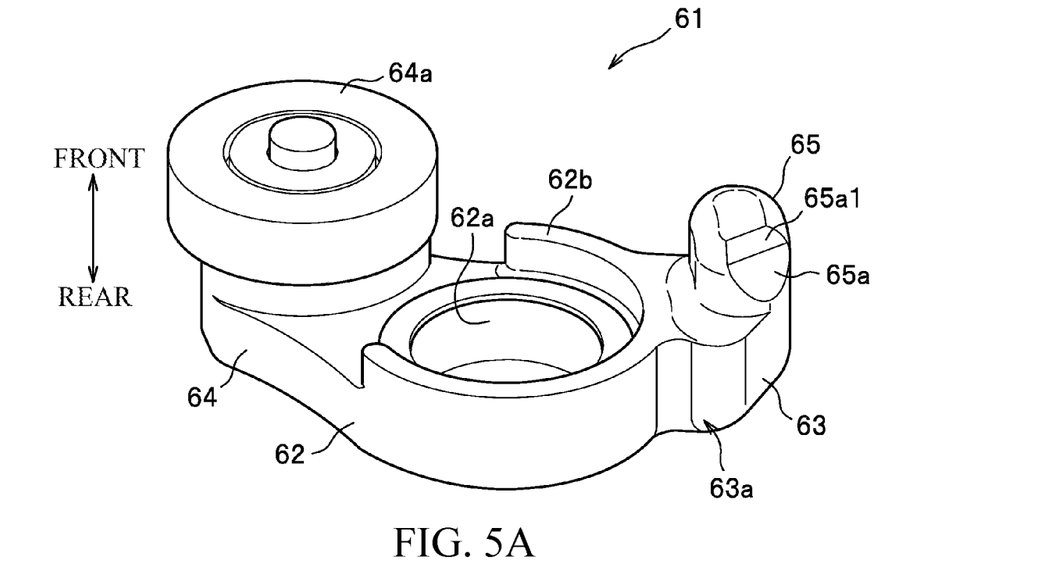
FIG. 5A is an enlarged perspective view of the abutting member for returning of the fishing spinning reel according to the embodiment of the present disclosure.
Figure 5B:
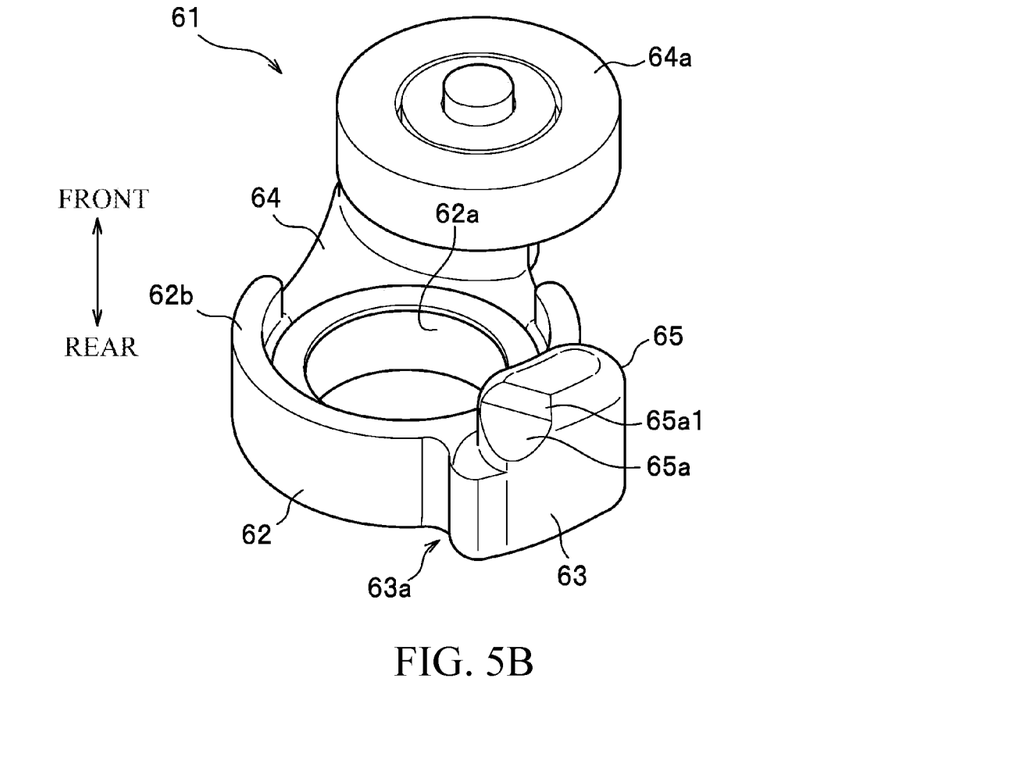
FIG. 5B is an enlarged perspective view of the abutting member for returning of the fishing spinning reel according to the embodiment of the present disclosure at a changed angle.

The bearing 62 comprises a hole 62a into which the rotational movement shaft 60 is inserted, as illustrated in FIGS. 5A and 5B. The bearing 62 has an annular shape that surrounds the hole 62a, and comprises a reinforcing wall 62b that protrudes to a front side in the axial direction, and has an arc shape.

Figure 3A:
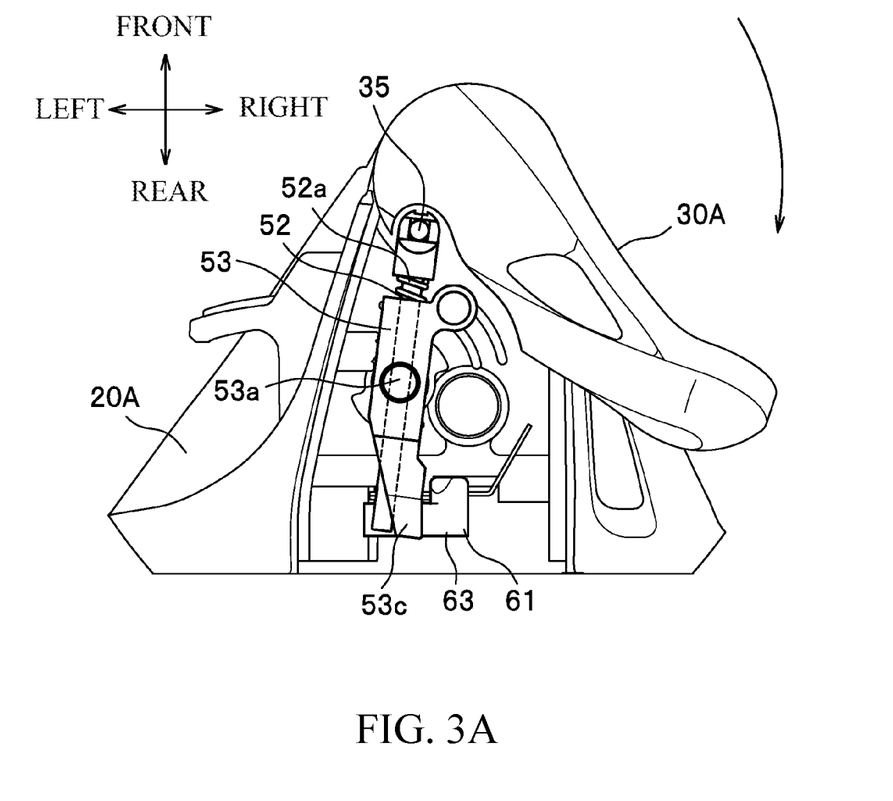
FIG. 3A is a side view illustrating an internal structure of the arm.
Figure 3B:
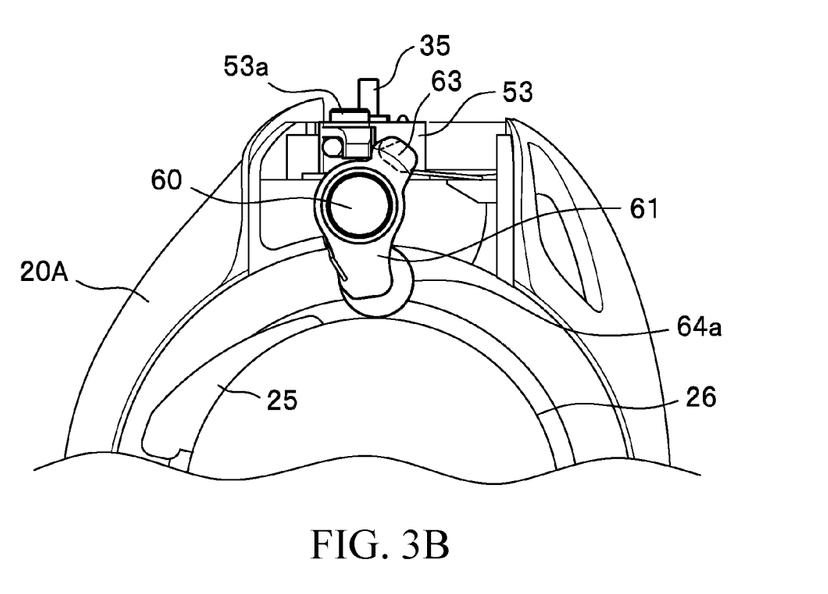
FIG. 3B is an explanatory diagram illustrating an abutting state of the abutting member for returning and the guide member.

The projection portion 63 is disposed on a roughly left-hand side of center axis O2 of the rotational movement shaft 60 in the fishing line winding-up position, as illustrated in FIGS. 2A and 2B and FIG. 4A. Furthermore, the projection portion 63 is disposed on a right-hand side of center axis O2 of the rotational movement shaft 60 in the fishing line releasing position, as illustrated in FIGS. 3A and 3B and FIG. 4B. On a side face of the projection portion 63, the first abutting portion 63a is disposed, as illustrated in FIG. 5A. The first abutting portion 63a is located on an outside in the radial direction of the bearing 62, and comprises a rounded surface that is continuous from an outer peripheral surface of the bearing 62. As a result of this, in a process in which the abutting member for returning 61 rotationally moves, the first abutting portion 63a suitably abuts onto the first guide face 54a in accordance with rotational movement. Furthermore, the first abutting portion 63a comprises an abutting face that is disposed to be roughly parallel to center axis O2 of the rotational movement shaft 60, when viewed from the radial direction of the rotational movement shaft 60. As a result of this, the first abutting portion 63a abuts onto the first guide face 54a of the guide abutting portion 53c in the fishing line releasing position to be roughly parallel to each other, as illustrated in FIG. 4B. The first abutting portion 63a, as described above, abuts onto the first guide face 54a of the guide abutting portion 53c in the first half of a rotational movement of the abutting member for returning 61 from the fishing line releasing position to the fishing line winding-up position.

On the other hand, on a side face of the protrusion portion 65, the second abutting portion 65a is disposed, as illustrated in FIGS. 5A and 5B. The second abutting portion 65a is located on a front side in the axial direction of the first abutting portion 63a, and comprises an inclined face obtained by obliquely cutting out a front-end corner of the protrusion portion 65, as illustrated in FIG. 5B. At an upper end of the second abutting portion 65a, a rounded surface 65a1 is continuously disposed. The second abutting portion 65a abuts onto the second guide face 54b of the guide abutting portion 53c in the fishing line winding-up position, as illustrated in FIG. 4A.

Note that in the abutting member for returning 61, the projection portion 63 and the protrusion portion 65 are always biased toward the guide abutting portion 53c in an abutting direction by a spring member 66 that is disposed around the rotational movement shaft 60, as illustrated in FIG. 2A.

The roller 64a of the abutting member for returning 61 protrudes to an inside in the radial direction of the rotor 2 in the fishing line releasing position, and comes into sliding contact with an outer peripheral portion 26 of a front portion of the reel body 1, as illustrated in FIG. 3B. The outer peripheral portion 26 is provided with a member for returning 25 in a position that interferes with the roller 64a. The member for returning 25 is configured to interfere with the roller 64a at the time of rotation in the fishing line winding-up direction of the rotor 2 due to an operation to rotate the handle 4, and apply, to the abutting member for returning 61, rotational movement force that causes the bail support members 30A and 30B to return to the fishing line winding-up position.

Next, the workings at a time when the bail support members 30A and 30B are manually raised from the fishing line winding-up position to the fishing line releasing position are described. If the bail support members 30A and 30B are manually raised from the fishing line winding-up position illustrated in FIGS. 2A and 2B to the fishing line releasing position illustrated in FIGS. 3A and 3B, the guide member 53 slides in a counterclockwise direction with the shaft portion 53a as a center in accordance with a rotational movement of the bail support members 30A and 30B, and the guide abutting portion 53c presses the abutting member for returning 61.

In this case, in the first half of a raising operation at the time of manual raising, the second guide face 54b of the guide abutting portion 53c presses the second abutting portion 65a of the abutting member for returning 61, and in the latter half of the raising operation, the first guide face 54a of the guide abutting portion 53c presses the first abutting portion 63a of the abutting member for returning 61. In accordance with these pressing motions, the abutting member for returning 61 rotationally moves with the rotational movement shaft 60 as a center, and the roller 64a of the abutting member for returning 61 comes into sliding contact with the outer peripheral portion 26 of the front portion of the reel body 1.

Next, the workings of the reversing mechanism 50 are described. If an operation has been performed to rotate the handle 4 in a state where the bail support members 30A and 30B are located in the fishing line releasing position, the roller 64a of the abutting member for returning 61 moves on the outer peripheral portion 26 of the front portion of the reel body 1, and runs on to a cam surface 25a of the member for returning 25, as illustrated in FIG. 6B.

Figure 6A:
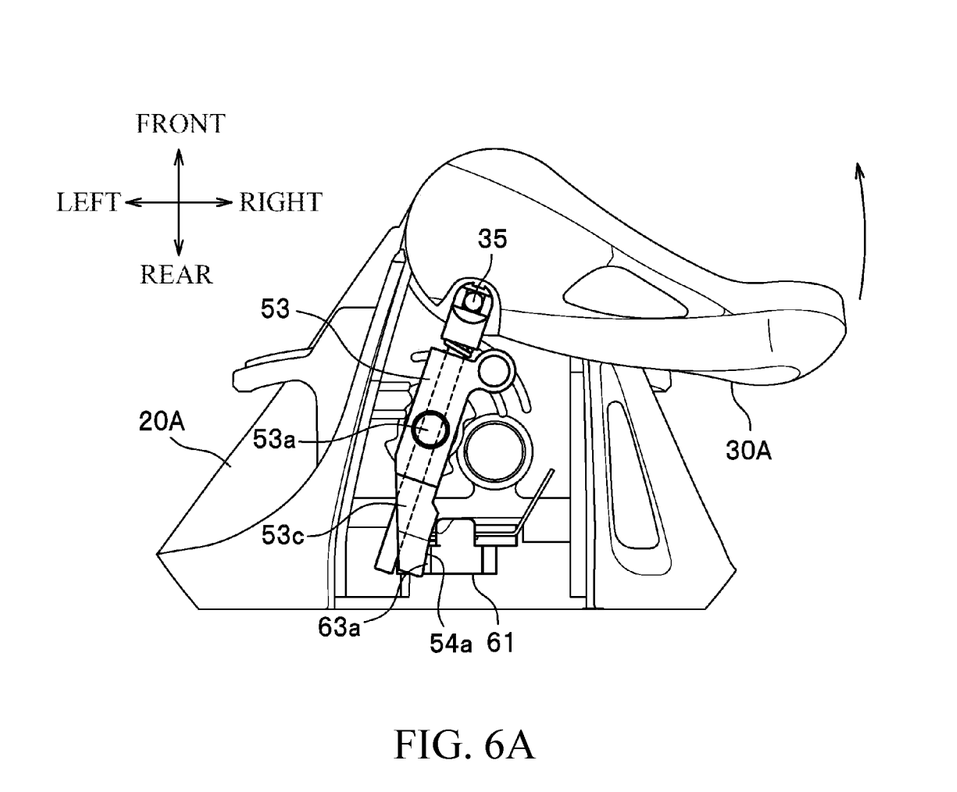
FIG. 6A is a side view illustrating an internal structure of the arm.
Figure 6B:
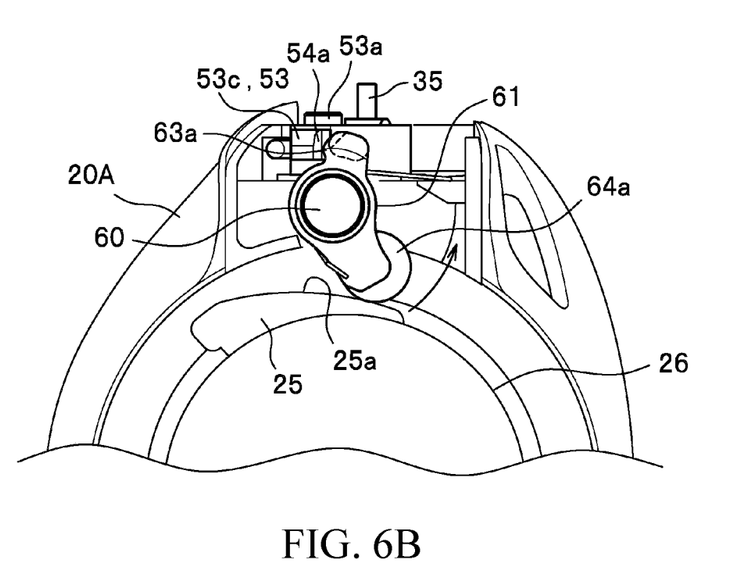
FIG. 6B is an explanatory diagram illustrating an abutting state of the abutting member for returning and the guide member.

Due to this running-on of the roller 64a, the abutting member for returning 61 rotationally moves in a clockwise direction with the rotational movement shaft 60 as a center, and the first guide face 54a of the guide member 53 is pressed by the first abutting portion 63a in accordance with this rotational movement, as illustrated in FIG. 6A. As a result of this, the guide member 53 swings in the clockwise direction with the shaft portion 53a as a center. Due to this swinging, a force that rotationally moves the bail support member 30A is transmitted through the shaft 52, and the bail support member 30A starts to rotationally move toward the fishing line winding-up position.

In the first half of swinging of the guide member 53, as described above, a state where the first guide face 54a of the guide member 53 is pressed by the first abutting portion 63a continues, and an abutting force of the first abutting portion 63a is suitably transmitted to the first guide face 54a of the guide member 53.

Then, the roller 64a of the abutting member for returning 61 climbs the cam surface 25a of the member for returning 25. In a process of moving to an apex face 25b, the abutting member for returning 61 further rotationally moves in the counterclockwise direction with the rotational movement shaft 60 as a center, and in accordance with this rotational movement, a portion that presses the guide member 53 changes from the first abutting portion 63a to the second abutting portion 65a.

Figure 7A:
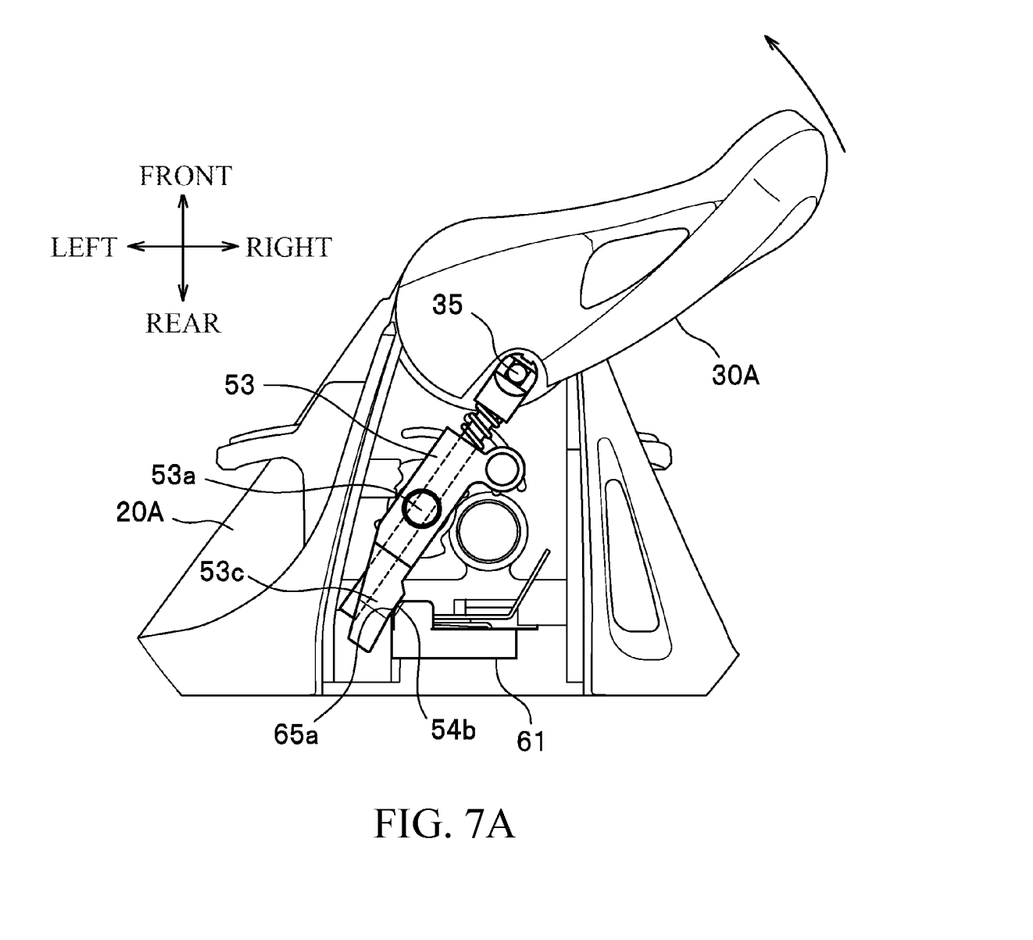
FIG. 7A is a side view illustrating an internal structure of the arm.
Figure 7B:
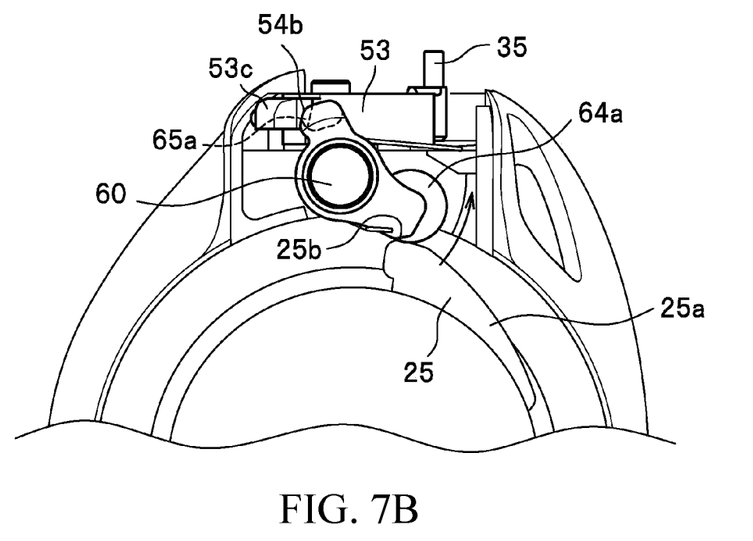
FIG. 7B is an explanatory diagram illustrating an abutting state of the abutting member for returning and the guide member.

Stated another way, in the latter half of swinging of the guide member 53, as illustrated in FIG. 7B, a portion that presses the guide member 53 changes from the first abutting portion 63a to the second abutting portion 65a around a switching point (a dead point) of a biasing force generated by the coil spring 52a of the guide 51, and after this change, an abutting force of the second abutting portion 65a is suitably transmitted to the second guide face 54b of the guide member 53. Note that a biasing force generated by the spring member 66 of the abutting member for returning 61 is also suitably used as an abutting force of the second abutting portion 65a.

The bail support member 30A receives the abutting forces generated by the first abutting portion 63a and the second abutting portion 65a, as described above, and is suitably caused to return to the fishing line winding-up position.

According to the present embodiment described above, the abutting member for returning 61 comprises two abutting portions, the first abutting portion 63a that abuts onto the first guide face 54a of the guide member 53 in the first half of a rotational movement of the abutting member for returning 61, and the second abutting portion 65a that abuts onto the second guide face 54b of the guide member 53 in the latter half of the rotational movement of the abutting member for returning 61. From among these abutting portions, the first abutting portion 63a is disposed in the projection portion 63 that projects to an outside in the radial direction from the bearing 62 that the rotational movement shaft 60 is inserted into, in the abutting member for returning 61. Therefore, an abutting force of the abutting member for returning 61 can be transmitted to the first guide face 54a of the guide member 53 on an extension in the radial direction of the bearing 62. Accordingly, in the abutting of the first abutting portion 63a and the first guide face 54a, the bearing 62 is not inclined relative to the rotational movement shaft 60, and a smooth rotational movement of the abutting member for returning 61 can be achieved. This enables an abutting force of the abutting member for returning 61 to be efficiently transmitted to the guide member 53, and an operation feeling at the time of returning in an operation to rotate the handle 4 can be improved.

Furthermore, a relationship between the length L1 from a center of swinging of the guide member 53 (the center of the shaft portion 53a) to the first guide face 54a and the length L2 from the center of swinging of the guide member 53 (the center of the shaft portion 53a) to the second guide face 54b satisfies L1>L2. Therefore, in the first half of a rotational movement of the abutting member for returning 61 that uses an abutting force that is greater than an abutting force of the latter half of the rotational movement, an abutting force of the abutting member for returning 61 can be efficiently transmitted to the guide. Accordingly, an operation feeling at the time of returning in an operation to rotate the handle 4 can be improved. Furthermore, in the latter half of the rotational movement of the abutting member for returning 61, the second abutting portion 65a abuts onto the second guide face 54b. Therefore, the guide member 53 does not need to be formed to be longer than necessary, and a reduction in size of a structure can be achieved. Note that the latter half of the rotational movement of the abutting member for returning 61 does not use an abutting force that is greater than an abutting force of the first half of the rotational movement. Therefore, even in a configuration in which the second abutting portion 65a abuts onto the second guide face 54b, the bearing 62 is not inclined relative to the rotational movement shaft 60, and an abutting force of the abutting member for returning 61 can be efficiently transmitted to the guide member 53.

Furthermore, an abutting face of the first abutting portion 63a and the first guide face 54a are roughly parallel to each other, when viewed from the radial direction of the rotational movement shaft 60. Therefore, an abutting force can be efficiently transmitted from the first abutting portion 63a to the first guide face 54a. Accordingly, an operation feeling at the time of returning in an operation to rotate the handle 4 can be further improved.

The embodiment of the present disclosure has been described above. The present disclosure is not limited to the embodiment described above, and can be appropriately modified without departing from the spirit of the present disclosure. For example, it is sufficient if the projection portion 63 of the abutting member for returning 61 projects from the bearing 62 to an outside in the radial direction, and comprises the first abutting portion 63a, and a variety of shapes can be employed. Furthermore, it is sufficient if the protrusion portion 65 of the abutting member for returning 61 protrudes from the projection portion 63 toward a side of the guide 51 in the axial direction of the rotational movement shaft 60, and comprises the second abutting portion 65a, and a variety of shapes can be employed.

Moreover, it is sufficient if the guide member 53 comprises the first guide face 54a that the first abutting portion 63a abuts onto, and the second guide face 54b that the second abutting portion 65a abuts onto, and satisfies a relationship of L1>L2, and a variety of shapes can be employed. Note that a central portion of the first guide face 54a does not need to be used as a reference point of the length L1, and a central portion of the second guide face 54b does not need to be used as a reference point of the length L2, either. The reference points of the length L1 and the length L2 may be set in appropriate positions of the first guide face 54a and the second guide face 54b.

Furthermore, in the embodiment described above, it has been described that a portion that presses the guide member 53 changes from the first abutting portion 63a to the second abutting portion 65a around a position where the dead point in returning is passed. However, this is not restrictive, and the portion may change before or after the dead point in returning.

REFERENCE SIGNS LIST

1 Reel body
2 Rotor
20A, 20B Arm
30A, 30B Bail support member
50 Reversing mechanism
51 Guide
54a First guide face
54b Second guide face
60 Rotational movement shaft
61 Abutting member for returning
62 Bearing
63 Projection portion
63a First abutting portion
65 Protrusion portion
65a Second abutting portion
L1 Length (length from center of swinging of guide to first guide face)
L2 Length (length from center of swinging of guide to second guide face)

What is claimed is:

1. A fishing spinning reel comprising:
an arm that is provided in a rotor included in a reel body;
a bail support member that is installed on the arm, and is rotationally movable between a fishing line winding-up position and a fishing line releasing position; and
a reversing mechanism that causes the bail support member to return from the fishing line releasing position to the fishing line winding-up position,
wherein the reversing mechanism comprises:
a guide that comprises a guide member with a guide abutting portion, and an end coupled to the bail support member, the guide being swingably installed on the arm; and
an abutting member for returning that is provided in the arm in a rotationally movable manner by using a rotational movement shaft, abuts the guide in accordance with rotation in a fishing line winding-up direction of the rotor, and causes the bail support member located in the fishing line releasing position to return to the fishing line winding-up position, the abutting member for returning comprises a bearing that the rotational movement shaft is inserted into, a projection portion that projects from the bearing to an outside in a radial direction with the rotational movement shaft as a center, and a protrusion portion that protrudes from the projection portion toward a side of the guide in an axial direction of the rotational movement shaft, the projection portion comprises a first abutting portion that abuts the guide in a first half of a rotational movement of the abutting member for returning, the protrusion portion comprises a second abutting portion that abuts the guide in a latter half of the rotational movement of the abutting member for returning, the guide abutting portion comprises a first guide face that is a flat abutting face which the first abutting portion, abuts, and a second guide face that is another flat abutting face which the second abutting portion abuts, wherein the first guide face and the second guide face are located on the guide abutting portion in positions different from each other in a front-rear direction of the reel, which corresponds to a direction in which an elongate spool shaft of the reel extends, wherein the first guide face is inclined relative to the second guide face toward a direction in which the first guide face is disposed closer toward the abutting member for returning when the reversing mechanism is in the fishing line releasing position, and in a case where a length from the center of swinging of the guide to the first guide face is L1, and a length from the center of the swinging of the guide to the second guide face is L2, a relationship of L1>L2 is satisfied.

2. The fishing spinning reel according to claim 1, wherein an abutting face of the first abutting portion and the first guide face abut each other to be roughly parallel to each other, when viewed from the radial direction of the rotational movement shaft.

3. The fishing spinning reel according to claim 1, wherein the the first guide face extends in a first plane and the second guide face extends in a second plane that is angled with respect to the first plane.

4. The fishing spinning reel according to claim 3, wherein the first guide face is formed on the guide abutting portion at a position that is distal relative to the second guide face.

5. The fishing spinning reel according to claim 1, wherein the first guide face and the second guide face are adjacent to each other on the guide abutting portion in the front-rear direction.

* * * * *